United States Patent
Takahashi

(10) Patent No.: US 10,404,465 B2
(45) Date of Patent: Sep. 3, 2019

(54) SEQUENTIAL BIOMETRIC CRYPTOSYSTEM AND SEQUENTIAL BIOMETRIC CRYPTOGRAPHIC PROCESSING METHOD

(71) Applicant: HITACHI, LTD., Tokyo (JP)

(72) Inventor: Kenta Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 161 days.

(21) Appl. No.: 15/515,346

(22) PCT Filed: May 25, 2015

(86) PCT No.: PCT/JP2015/064871
§ 371 (c)(1),
(2) Date: Mar. 29, 2017

(87) PCT Pub. No.: WO2016/051856
PCT Pub. Date: Apr. 7, 2016

(65) Prior Publication Data
US 2017/0222809 A1 Aug. 3, 2017

(30) Foreign Application Priority Data

Sep. 30, 2014 (JP) ................................ 2014-201055

(51) Int. Cl.
*H04L 9/32* (2006.01)
*G06F 21/32* (2013.01)
*H04L 29/06* (2006.01)

(52) U.S. Cl.
CPC ............ *H04L 9/3231* (2013.01); *G06F 21/32* (2013.01); *H04L 9/32* (2013.01); *H04L 63/0861* (2013.01)

(58) Field of Classification Search
CPC .... H04L 9/3231; H04L 63/0861; G06F 21/32
See application file for complete search history.

(56) References Cited

U.S. PATENT DOCUMENTS 5,991,408 A 11/1999 Pearson et al.
2002/0120592 A1 8/2002 Juels et al.
(Continued)

FOREIGN PATENT DOCUMENTS

EP 2113867 A2 11/2009
EP 2503509 A1 9/2012
(Continued)

OTHER PUBLICATIONS

Ross et al., "Information fusion in biometrics", pp. 37-58, 2006, https://link.springer.com/content/pdf/10.1007/0-387-33123-9_2.pdf (Year: 2006).*

(Continued)

*Primary Examiner* — Hee K Song
(74) *Attorney, Agent, or Firm* — Volpe and Koenig, P.C.

(57) ABSTRACT

A sequential biometric cryptosystem includes: a registration terminal that extracts a set of feature data from each of multiple pieces of biological information acquired from each user, sequentially selects, out of these, a group of multiple sets of feature data, incrementing the number of combined sets, creates a protection template for each selected group of feature data, and stores the protection template into a storage apparatus. The sequential biometric cryptosystem also includes an authentication terminal that extracts feature data from a combination including one or more pieces of biological information of a specified user, acquired through a sensor on the user, verifies a combination of the extracted feature data against the protection template derived from the biological information having the same specified attribute, and performs, if the verification is successful, specified processing on the user.

10 Claims, 6 Drawing Sheets

(56) References Cited

U.S. PATENT DOCUMENTS

| | | | |
|---|---|---|---|
| 2003/0219121 A1 | 11/2003 | van Someren | |
| 2008/0252412 A1* | 10/2008 | Larsson | B60R 25/25 340/5.2 |
| 2008/0273769 A1* | 11/2008 | Lo | G06K 9/00087 382/125 |
| 2010/0058063 A1* | 3/2010 | Tuyls | H04L 9/3231 713/172 |
| 2013/0263238 A1* | 10/2013 | Bidare | G07C 9/00087 726/7 |
| 2015/0033305 A1* | 1/2015 | Shear | G06F 21/45 726/11 |

FOREIGN PATENT DOCUMENTS

| | | |
|---|---|---|
| JP | 2003-030154 A | 1/2003 |
| JP | 2003-186836 A | 7/2003 |
| WO | 2000/051244 A1 | 8/2000 |

OTHER PUBLICATIONS

Subha et al., "A Study on Authenticated Admittance of ATM Clients Using Biometrics based Cryptosyste", 2012, IJAET, vol. 4, Issue 2, pp. 456-463 (Year: 2012).*

Soliman et al., "Feature Level Fusion of Palm Veins and Signature Biometrics", IJVIPNS-IJENS vol. 12 No. 01, pp. 28-39 (Year: 2012).*

Rattani et al., "Feature Level Fusion of Face and Fingerprint Biometrics", 2007, IEEE, pp. 1-6 (Year: 2007).*

Murakami et al., "Optimal sequential fusion for multibiometric cryptosystems", Information Fusion 32 (2016) 93-108 (Year: 2016).*

Y. Dodis, et. al., "Fuzzy Extractors: How to Generate Strong Keys from Biometrics and Other Noisy Data", in Eurocypt 2004, vol. 3027 of LNCS, pp. 523-540, 2004.

K. Takahashi, et. al., "A Secure and User-Friendly Multi-Modal Biometric System", International Symposium on Defence and Security 2004, 2014.

Geetika, M.K., "Multimodal Based Fuzzy Vault Using Iris Retina and Fingervein", 2013 Fourth International Conference on Computing, Communications and Networking Technologies, Jul. 2013. p. 1-5, especially II. Fuzzy Vault VI. Proposed Method.

English Translation of Office Action for JP 2014-201055, dated Feb. 21, 2017.

Johannes Merkle et al: "Multi-Modal and Multi-Instance Fusion for Biometric Cryptosystems", Biometrics Special Interest Group (BIOSIG), 2012 BIOSIG—Proceedings of the International Conference of the, IEEE, pp. 1-6, ISBN : 987-1-4673-1010-9 (Sep. 6, 2012).

Extended European Search Report dated Feb. 2, 2018 for the European Application No. 15845864.6.

* cited by examiner

SEQUENTIAL BIOMETRIC CRYPTOSYSTEM AND SEQUENTIAL BIOMETRIC CRYPTOGRAPHIC PROCESSING METHOD

TECHNICAL FIELD

The present invention relates to a sequential biometric cryptosystem and a sequential biometric cryptographic processing method.

BACKGROUND ART

Biometric authentication techniques are widely used which authenticate a person based on biological information such as a fingerprint, veins, a face, and an iris. In conventional biometric authentication techniques, at user registration, feature data (a template) extracted from the user's biological information are registered in a system. At user authentication, feature data extracted from the user's biological information again are compared with the template. If the similarity between them is large enough (the distance is small enough), it is determined that the authentication succeeded, and if not, it is determined that the authentication failed.

However, since biological information is irreplaceable, the occurrence of the leakage causes a serious problem. To address this problem, template-protecting biometric authentication techniques are being developed in which authentication is performed with biological information kept hidden. Among such techniques, a technique called biometric cryptography is attracting attention which generates key data from biological information and performs processing such as cryptographic authentication, encryption, signature generation, and the like.

In the above biometric cryptography, at a registration, a protection template T is created by converting feature data X of biological information. Thereafter, feature data X' of newly acquired biological information are verified against the protection template T. If the verification succeeds, processing such as authentication, encryption, and placement of a signature can be performed. In such biometric cryptography, reconstituting or estimating X from T needs to be sufficiently difficult (requirement for security). In addition, if X' is sufficiently similar to X (the distance is small), only in that case, processing such as authentication, encryption, and placement of a signature needs to succeed (requirement for integrity and soundness). Moreover, if X and X' are the feature data extracted from the same biological information of a person, only in that case, X and X' need to be sufficiently similar (the distance needs to be small) at a high probability (requirement for accuracy).

As a specific implementation method of such biometric cryptography described above, for example, a technique has been proposed in which a secret key K is generated randomly at a registration, auxiliary information $H=F(X, K)$ is created by calculating a hash value of the secret key $h=Hash(K)$ and embedding K into the biological information X in an inseparable form, and a combination of H and h is taken as a protection template T ($T=(H, h)$) (See Non Patent Literature 1). In this technique, when the key is reconstituted, biological information X' is acquired again, and using auxiliary information H, the secret key $K'=G(X',$ is reconstituted. If X' is close enough to X, an error correction coding technique and the like are used so that K' is equal to K ($K'=K$). If the equation Hash $(K')=h$ holds, it is taken that the verification is successful. In this case, using the reconstituted K ($=K'$), the processing such as authentication, encryption, signature generation, and the like can also be performed.

Generally, the accuracy of a biometric authentication system is evaluated with a false acceptance rate (FAR) and a false rejection rate (FRR). If the FAR is large, the risk of impersonation by an inauthentic person increases, and if the FRR is large, the authentic person cannot be authenticated, which leads to lower availability. In general, the FAR and the FRR can be controlled with an authentication threshold t However, there is a trade-off relationship in which reducing one increases the other, and it is difficult to reduce both.

In general, biometric authentication techniques, as a measure against this problem, a multimodal biometric authentication technique has been proposed, which combines multiple pieces of biological information, for example, a combination of the ten fingers of both hands, or a combination of a fingerprint, veins, an iris, and the like, to make the FAR small enough while also keeping the FRR small. In the multimodal biometric authentication, each piece of biological information is registered as a template. For example, in the case where the ten fingers of both hand are used, the templates for the ten fingers are registered. Also at the time of authentication, each piece of biological information is acquired and verified against the corresponding template, and considering all the verification results, it is determined whether the authentication is successful or failed.

However, if the authentication requires inputs of all pieces of biological information, it makes the user operation complicated, leading to a decrease in convenience. For this reason, a sequential determination technique has also been proposed in which verification and determination are executed every time one piece of biological information is inputted, and in which the processing is terminated when it is determined that the authentication is successful.

For example, there is an OR determination method in which a piece of biological information is simply inputted and verified, and if it is sufficiently similar, it is determined that the authentication is successful. However, since the OR determination method only executes verification and determination using each piece of biological information separately, in order to make the FAR of each determination sufficiently small, the threshold for each determination needs to be sufficiently strict. As a result, the FRR of each determination becomes large. By repeating verification and determination multiple times, the FRR as a total can be reduced to some extent. However, the information possessed by combinations of multiple pieces of biological information cannot be utilized effectively, and the improvement effect on authentication accuracy in total is limited.

On the other hand, as a more advanced sequential determination method, a method using a sequential probability ratio test has also been proposed (see Non Patent Literature 2). This technique is a method in which every time biological information $X_k$ ($k=1, 2, \ldots, n$) is verified, a verification score (similarity level or distance) $S_k$ is normalized to a likelihood ratio $L_k$ using the statistical distribution they follow, and $M_k = L_1 \times L_2 \times \ldots \times L_k$ is compared with a threshold t. It has been proved that this method is the best sequential determination method in terms of authentication accuracy and the average number of verifications. The sequential probability ratio test is an effective method in the case where the similarity level or distance expressed with a continuous scale or multiple values can be calculated as the verification score $S_k$.

CITATION LIST

Non Patent Literature

[NPL 1] Y. Dodis, et.al., "Fuzzy extractors: How to generate strong keys", In Eurocrypt 2004, Vol. 3027 of LNCS, pp. 523-540, 2004
[NPL 2] K. Takahashi, et.al., "A Secure and User-Friendly Multi Modal Biometric System", International Symposium on Defence and Security 2004, 2014

SUMMARY OF INVENTION

Technical Problem

As described above, in biometric cryptography, reconstituting or estimating feature data X from a protection template T needs to be sufficiently difficult (requirement for security). However, if some verification score (similarity level or distance value) can be calculated when feature data X' is verified against a protection template T, it may be possible for an attacker to eventually find feature data X' the similarity level of which is above the threshold t, by repeating processing, such as executing verification while applying various small perturbations to an arbitrary initial value X0, and adopting perturbations in the direction in which the similarity level becomes larger (the distance becomes smaller). In order to prevent such a situation, in the biometric cryptography, a verification result needs to be one of two values, 1 (matched) and 0 (mismatched). In addition, for the same reason, the threshold value in the biometric cryptography may not be changed at the time of authentication. In fact, the biometric cryptography has a mechanism in which a threshold t is set when a protection template T is created and thereafter t cannot be changed. For example, in the technique disclosed in Non Patent Literature 1, coding processing is executed using error correction codes when auxiliary information is created, and the correction capability set at that time (such as up to how many bit error is allowed) corresponds to the threshold t.

From the reasons above, when aiming to improve the accuracy and the convenience applying an approach of the multimodal biometric authentication, it is impossible to apply an approach that utilizes verification scores and has an accuracy improvement effect (for example, the sequential probability ratio test). The OR determination is applicable, but the effect of improving accuracy would be limited.

Hence, an object of the present invention is to provide a technique in biometric cryptography that implement sequential multimodal determination having a high accuracy improvement effect and achieves good security, accuracy, and convenience all together regarding cryptographic processing.

Solution to Problem

A sequential biometric cryptosystem according to the present invention to solve the above problems includes a computing apparatus that executes registration processing including: extracting a set of feature data from each of multiple pieces of biological information acquired from each user; sequentially selecting, out of the extracted multiple sets of feature data, a group of multiple sets of feature data, incrementing the number of combined sets; creating a protection template for each selected group of feature data; and storing the protection template into a storage apparatus, and verification processing including: extracting feature data of a specified user from a combination including one or more pieces of biological information on the user acquired through a sensor; verifying a combination of the extracted feature data against the protection template derived from the biological information having the same specified attribute as the combination of the extracted feature data; and performing, if the verification is successful, specified processing on the user.

In addition, a sequential biometric cryptography processing method according to the present invention is characterized in that an information processing apparatus executes registration processing including: extracting a set of feature data from each of multiple pieces of biological information acquired from each user; sequentially selecting, out of the extracted multiple sets of feature data, a group of multiple sets of feature data, incrementing the number of combined sets; creating a protection template for each selected group of feature data; and storing the protection template into a storage apparatus, and verification processing including: extracting feature data of a specified user from a combination including one or more pieces of biological information on the user acquired through a sensor; verifying a combination of the extracted feature data against the protection template derived from the biological information having the same specified attribute as the combination of the extracted feature data; and performing, if the verification is successful, specified processing on the user.

Advantageous Effects of Invention

The present invention makes it possible to implement the sequential multimodal determination having a high accuracy improvement effect and achieve good security, accuracy, and convenience all together regarding the cryptographic processing, in the biometric cryptography.

DESCRIPTION OF EMBODIMENTS

———System Configuration———

Figure 1:
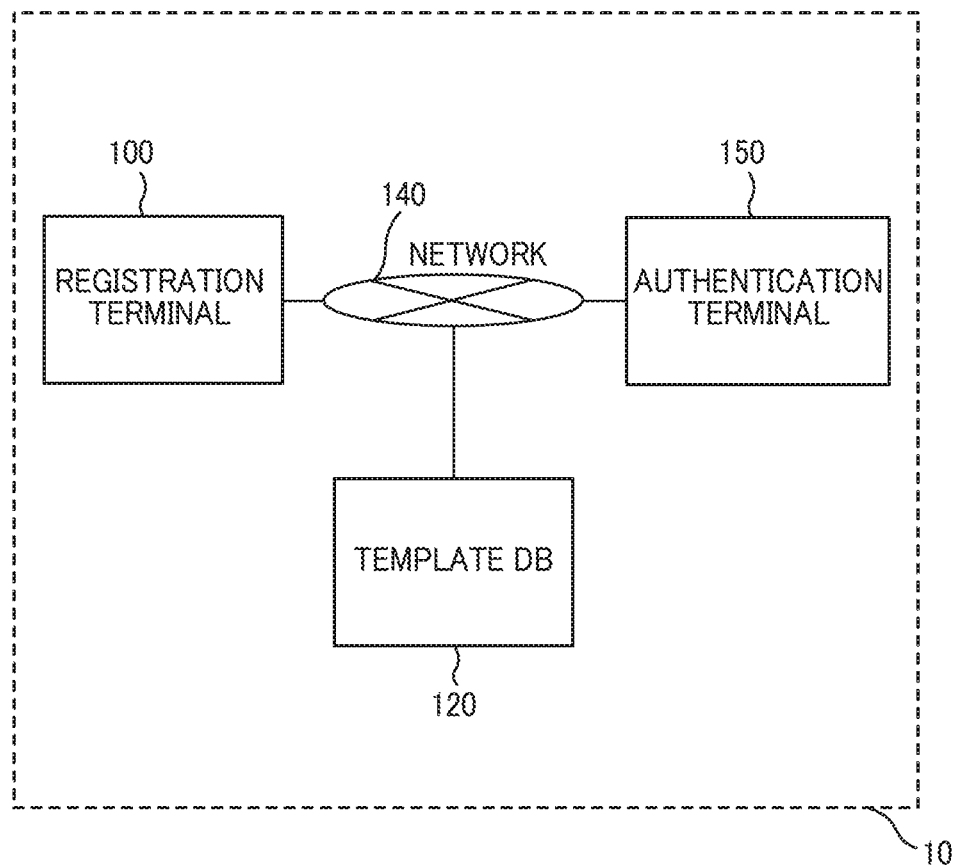
FIG. 1 is a network configuration diagram including a sequential biometric cryptosystem of the embodiment.

Hereinafter, an embodiment of the present invention will be described in detail using the drawings. FIG. 1 is a network configuration diagram including a sequential biometric cryptosystem 10 of this embodiment. The sequential biometric cryptosystem 10 illustrated in FIG. 1 is a computer system that implements sequential multimodal determination having a high accuracy improvement effect and achieves good security, accuracy, and convenience all together regarding the cryptographic processing, in biometric cryptography.

It is assumed that the sequential biometric cryptosystem 10 in this embodiment includes a registration terminal 100, an authentication terminal 150, and a template database 120, those coupled via a network 140. Among those, the registration terminal 100 is a terminal that creates protection templates from users' biological information and in which the protection templates are registered. The authentication terminal 150 is a terminal that acquires multiple pieces of a user's information when executing authentication processing and the like and extracts specified feature data, verifies the feature data against the protection templates in the template database 120, and executes specified processing, such as user authentication, encryption and decryption of data, and creation of electronic signatures. The template database 120 is a database that stores the protection templates created by the above registration terminal 100, associating the protection templates with the user IDs.

Note that the template database 120 may be implemented in a separate server machine, or a configuration in which the template database 120 is implemented in either the registration terminal 100 or the authentication terminal 150 may be employed. Alternatively, it is also possible to assume situations where a different implementation configuration is employed for such a template database 120 for each user. For example, the template database 120 may be held in a portable medium or a device under personal control, such as a card, a USB memory, and a mobile terminal owned by each user. In addition, at least two or more of the registration terminal 100, the authentication terminal 150, and the template database 120 may be implemented in the same apparatus. In the case where all of the registration terminal 100, the authentication terminal 150, and the template database 120 are implemented in the same apparatus, the network 140 does not need to be included.

———Example Of Hardware Configuration———

Figure 2:
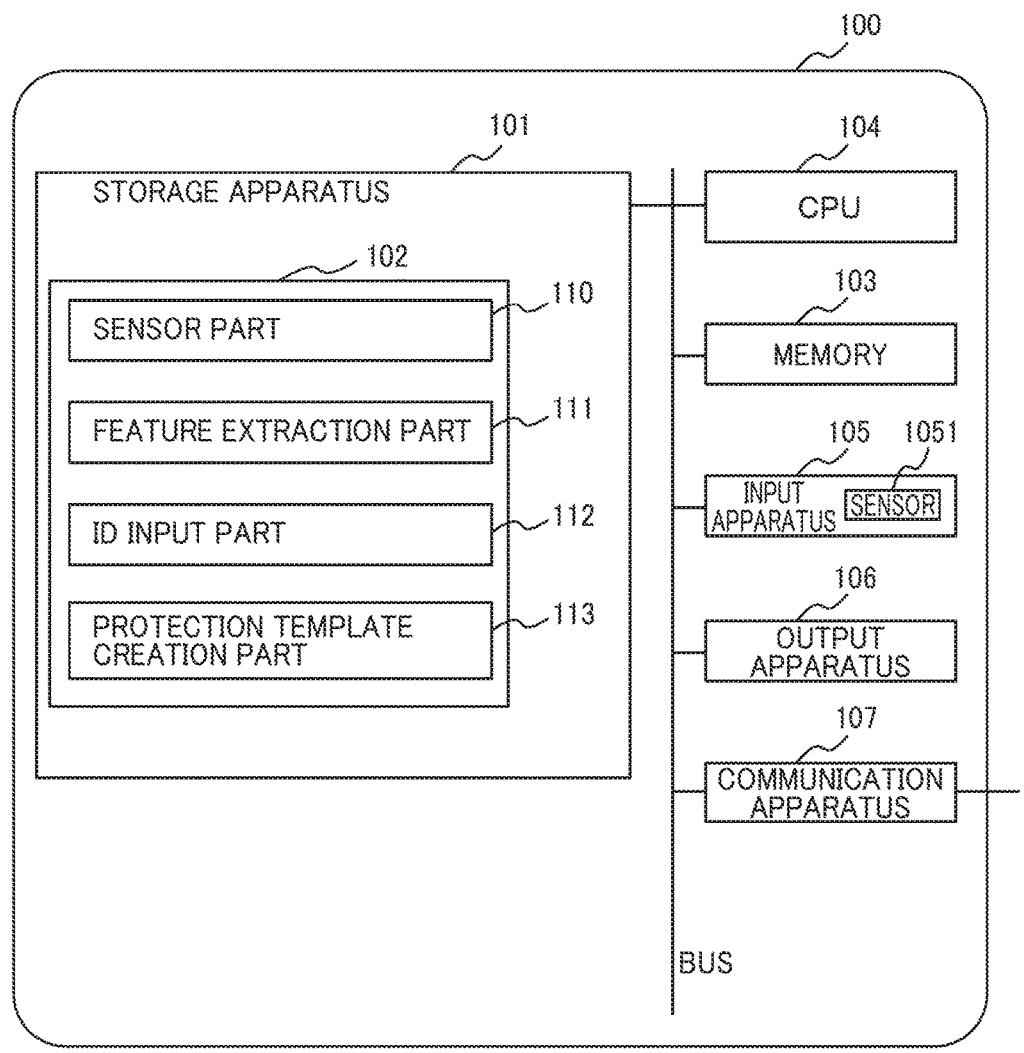
FIG. 2 is a diagram illustrating a hardware configuration example of a registration terminal included in the sequential biometric cryptosystem of this embodiment.

Next, descriptions will be provided for an example of the hardware configuration of the apparatuses described above included in the sequential biometric cryptosystem 10 of this embodiment. FIG. 2 is a diagram illustrating a hardware configuration example of the registration terminal 100 included in the sequential biometric cryptosystem 10 of this embodiment.

The registration terminal 100 of this embodiment includes a storage apparatus 101 including an appropriate nonvolatile storage element, such as a solid state drive (SSD) or a hard disc drive; a memory 103 including a volatile storage element, such as RAM; a CPU 104 that performs reading out a program 102 held in the storage apparatus 101 into the memory 103 and other related operation, and executes the program 102 in order to perform overall control of the apparatus itself as well as to perform various determinations, calculations, and control processing; an input apparatus 105 including a sensor 1051 for biological information; an output apparatus 106, such as a display, that displays processing data; and a communication apparatus 107 coupled with the network 140 and responsible for processing to communicate with other apparatuses.

Note that the function parts implemented in the registration terminal 100 by executing the program 102 include a sensor part 110, a feature extraction part 111, an ID input part 112, and a protection template creation part 113. Details of these function parts 110 to 113 will be described later.

Figure 3:
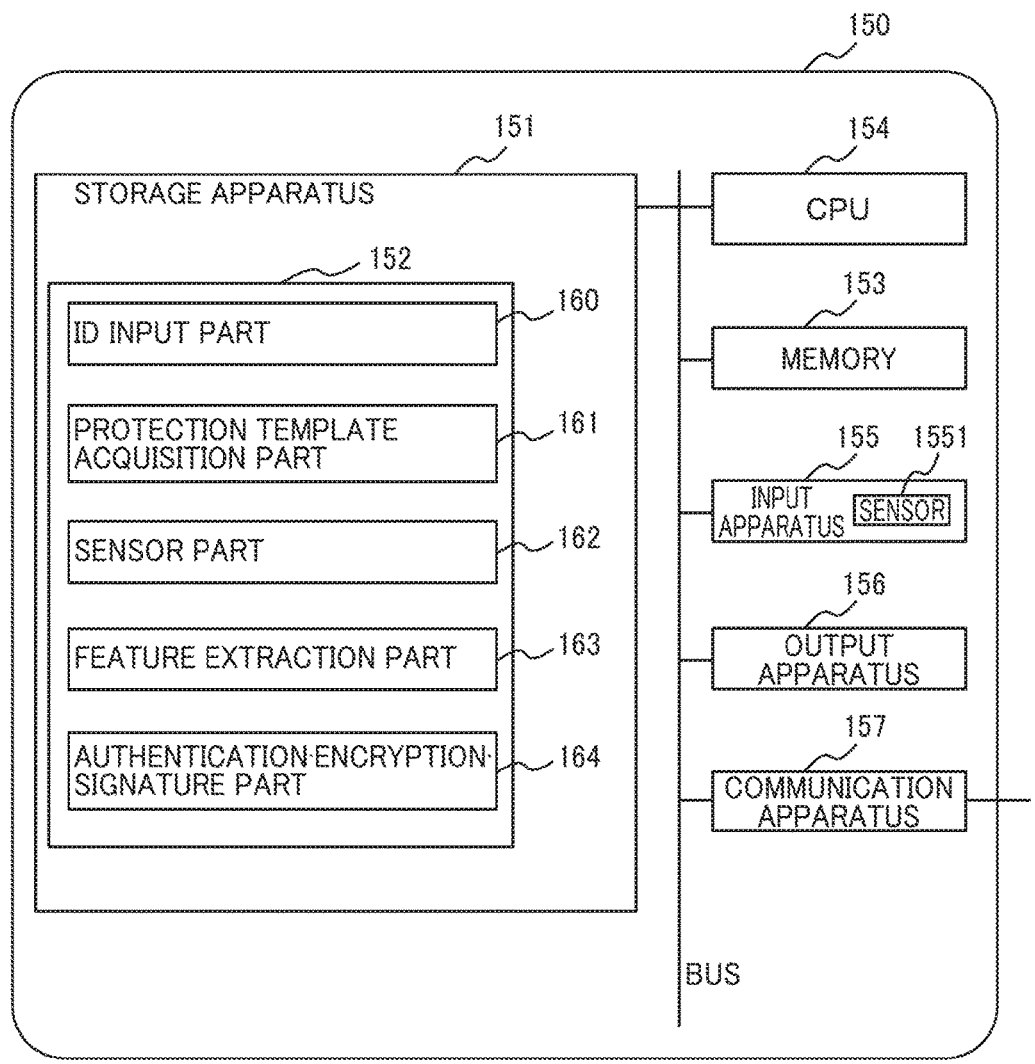
FIG. 3 is a diagram illustrating a hardware configuration example of an authentication terminal included in the sequential biometric cryptosystem of this embodiment.

On the other hand, the authentication terminal 150 included together with the registration terminal 100 in the sequential biometric cryptosystem 10 of this embodiment includes, as illustrated in FIG. 3, a storage apparatus 151 including an appropriate nonvolatile storage element, such as a solid state drive (SSD) or a hard disc drive; a memory 153 including a volatile storage element, such as RAM; a CPU 154 that performs reading out a program 152 held in the storage apparatus 151 into the memory 153 and other related operation, and executes the program 152 in order to perform overall control of the apparatus itself as well as to perform various determinations, calculations, and control processing; an input apparatus 155 including a sensor 1551 for biological information; an output apparatus 156, such as a display, that displays processing data; and a communication apparatus 157 coupled with the network 140 and responsible for processing to communicate with other apparatuses.

Note that the function parts implemented in the authentication terminal 150 by executing the program 152 include an ID input part 160, a protection template acquisition part 161, a sensor part 162, a feature extraction part 163, an authentication•encryption•signature part 164. Details of these function parts 160 to 164 will be described later.

———Examples Of Functions———

Next, descriptions will be provided for functions included in each apparatus included in the sequential biometric cryptosystem 10 of this embodiment. As described above, it can be said that the functions described hereafter are the functions implemented by the apparatuses, included in the sequential biometric cryptosystem 10, executing programs, for example. Here, descriptions will be provided for the functions included in the registration terminal 100 and the authentication terminal 150.

To begin with, the sensor part 110 in the registration terminal 100 of this embodiment includes the function of acquiring via the sensor 1051 included in the input apparatus 105, multiple pieces of biological information for registration, such as fingerprints and veins, from a user presenting specified parts of the user's body (hereinafter, a registration target user) to the sensor 1051. The sensor 1051 maybe included in the input apparatus 105 for each kind of biological information, such as fingerprints, veins, and irises. Or, in the case where biological information of different parts, but the same kind, such as fingerprints, are to be processed, only one sensor 1051 may be used.

The feature extraction part 111 in the registration terminal 100 includes the function of extracting multiple sets of feature data for registration from multiple pieces of biological information for registration acquired from the registration target user by the sensor part 110 described above.

The ID input part 112 in the registration terminal 100 includes the function of receiving the user ID inputted by the above registration target user through an interface, such as a touch panel or a keyboard, in the input apparatus 105.

The protection template creation part 113 in the registration terminal 100 includes the function of sequentially selecting a group of multiple sets of feature data, incrementing the number of combined sets, out of the multiple sets of feature data for each registration target user extracted by the feature extraction part 111 described above; creating a protection template that achieves a specified false acceptance rate for each selected group of feature data; and storing the protection template into the template database 120, at least associating the protection template with the user ID of the corresponding registration target user.

Note that the protection template creation part 113 also includes the function of, when creating the protection template, sequentially selecting a group of multiple sets of feature data for registration out of the above multiple sets of feature data for registration, incrementing the number of combined sets, in the input order of biological information determined for each registration target user in advance; and creating a protection template that achieves a specified false acceptance rate for each selected group of feature data for registration.

In addition, the protection template creation part 113 also includes the function of, when selecting a group of feature data for registration in the number of combined sets described above out of the above multiple sets of feature data for registration to create the protection template, selecting all the possible combinations of feature data for registration within the specified number of combined sets; and creating a protection template that achieves a specified false acceptance rate for each selected group of feature data for registration.

Next, the ID input part 160 in the authentication terminal 150 includes the function of receiving the user ID inputted by a user hoping for a specified processing, such as personal authentication, (hereinafter, an authentication target user) through an interface, such as a touch panel or a keyboard, in the input apparatus 155.

The protection template acquisition part 161 in the authentication terminal 150 includes the function of searching the template database 120 using the user ID acquired by the above ID input part 160 as a key, and acquiring the protection templates associated with the corresponding user ID.

The sensor part 162 in the authentication terminal 150 includes the function of acquiring one or more pieces of biological information, such as fingerprints and veins, from the above authentication target user, presenting specified parts of the user's body to the sensor 1551, through the sensor 1551 included in the input apparatus 155. Note that after starting processing for the above authentication target user, every time the authentication target user lets the sensor 1551 read a body part of the user (for example, one of the finger prints), the sensor part 162 acquires the biological information of a different body part. In other words, after starting the processing for the authentication target user, the sensor part 162 sequentially acquires biological information of mutually different body parts of the user (in accordance with operation of the user).

The feature extraction part 163 in the authentication terminal 150 includes the function of extracting feature data on a combination of one or more pieces of biological information of the authentication target user acquired by the above sensor part 162.

The authentication•encryption•signature part 164 in the authentication terminal 150 includes the function of verifying the feature data extracted by the above feature extraction part 163 against the protection template associated with the corresponding user ID (which was acquired by the ID input part 160) among the protection templates in the template database 120 and having the same attribute, in other words, the protection template derived from the biological information of the same body parts, and depending on the result, performing specified processing, such as authentication, encryption and decryption of data, and creation of an electronic signature for the above authentication target user.

Note that the authentication•encryption•signature part 164 of this embodiment extracts feature data from all pieces of biological information acquired after the sensor part 162 starts acquiring biological information and before a certain point of time (for example, both pieces of biological information of the first finger and the second finger) and combines the feature data; verifies this combination of the feature data against the protection template derived from the biological information associated with the corresponding user ID and having the same attribute (for example, the pieces of the biological information of the first finger and the second finger); and if the verification is successful, executes the above specified processing for the authentication target user described above.

The authentication•encryption•signature part 164 includes the function of, if the above verification between the feature data and the protection template fails in this operation, determining whether the number of pieces of biological information acquired since the above start of acquiring biological information has reached a specified number; and as a result of this determination, if the number of acquired pieces of biological information has not reach the specified number, iterating the processing of the sensor part 162 sequentially acquiring mutually different pieces of biological information, and the processing of verifying the combination of feature data against the protection template and the subsequent steps. In addition, the authentication•encryption•signature part 164 further includes the function of, if the number of acquired pieces of biological information has reached the specified number as a result of the above determination, determining that the verification processing failed and terminating the subsequent processing.

——————Example Of Data Structure——————

Figure 4:
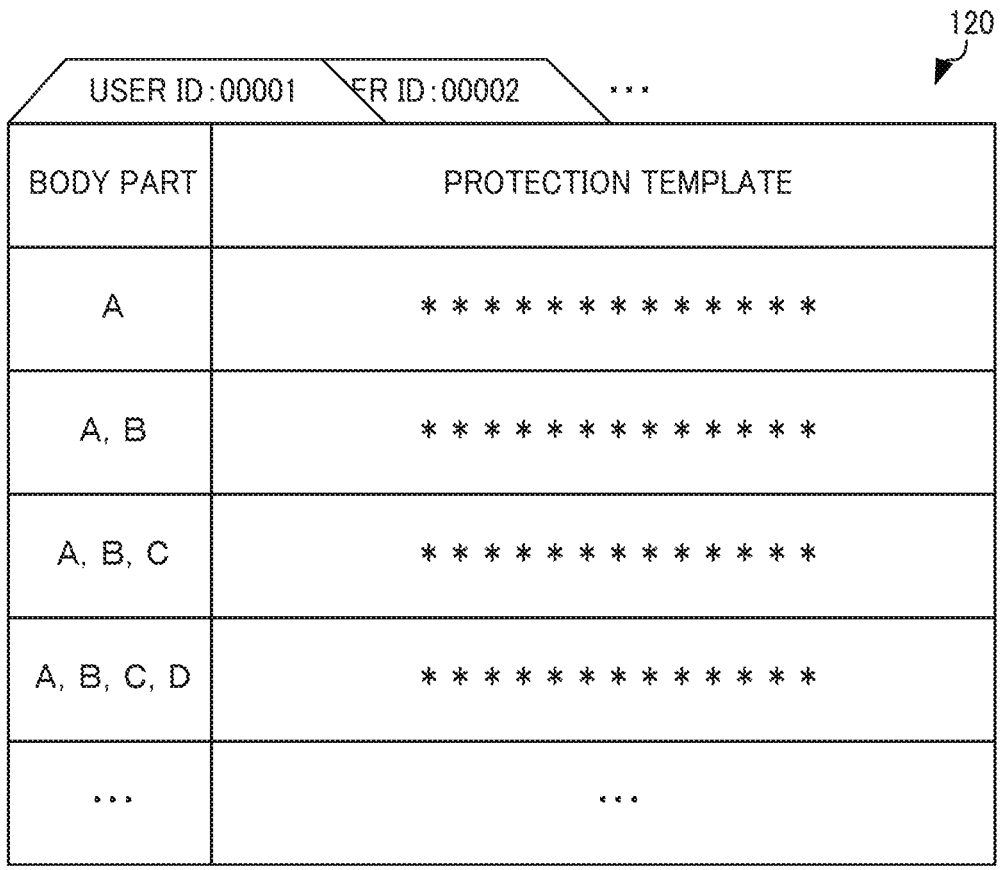
FIG. 4 is a diagram illustrating a structure example of a template database of this embodiment.

Next, descriptions will be provided for an example of data structure in the template database 120 used by the sequential biometric cryptosystem 10 of this embodiment. FIG. 4 is a diagram illustrating a structure example of the template database 120 of this embodiment. As illustrated in FIG. 4, the template database 120 of this embodiment is a collection of records, in which data of protection templates are associated with identification information of body parts as keys for each user ID. In the example of the template database 120 in FIG. 4, the database includes a protection template created from the biological information of "A" among the body parts; a protection template created from the biological information of "A" and "B"; a protection template created from the biological information of "A", "B", and "C"; and a protection template created from the biological information of "A", "B", "C", and "D", for the user having the user ID: 00001.

The identification information on the body parts in the template database 120 may be character strings corresponding to the registration order of the body parts to be subjected to the registration operation by the user. Thus, in this case, if the identification information of body parts in a record in the template database 120 is "A, B, C", it indicates that the user did the registration operation of biological information to the registration terminal 100 in the order of the body part "A"→the body part "B"→the body part "C". It also means that when the user is later subjected to the verification processing, the user lets the sensor 1551 of the authentication terminal 150 sequentially read the corresponding body parts of the user in the order of the body parts indicated by the character string.

——————Example 1 Of Processing Procedure——————

Hereinafter, descriptions will be provided for the actual procedure of a sequential biometric cryptography processing method of this embodiment based on the figure. The various operations described hereafter to perform the sequential biometric cryptography processing method are implemented by programs read into memories or the like and executed by the registration terminal 100, the authentication terminal 150, and the like included in the sequential biometric cryptosystem 10. The programs include codes for performing the various operations described hereafter.

Figure 5:
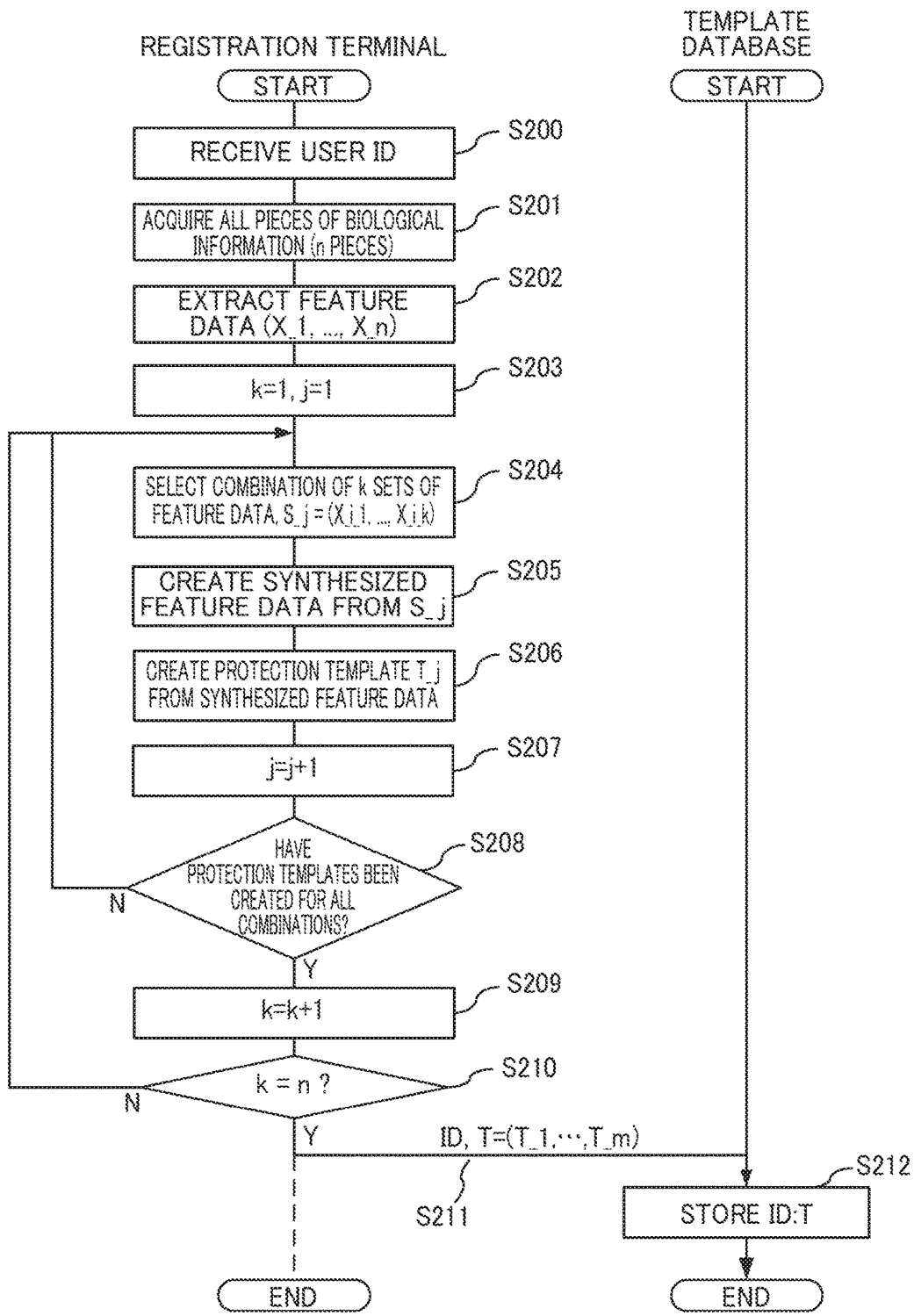
FIG. 5 is a flowchart illustrating a processing procedure example 1 of a sequential biometric cryptography processing method of this embodiment.

FIG. 5 is a flowchart illustrating a processing procedure example 1 of the sequential biometric cryptography processing method in this embodiment, to be specific, a flowchart illustrating registration processing in the sequential biometric cryptography processing method. For example, assume the situation where a user of a banking institution operates a registration terminal 100 installed in the baking institution to register the user's biological information for receiving services from the banking institution.

Here, first, the ID input part 112 of the registration terminal 100 receives a user ID inputted by the above user, in other words, the registration target user, with the input apparatus 105, such as a touch panel, and stores the user ID into the memory 103 temporarily (S200). Assume that following the input of the user ID, the registration target user holds his/her fingers over the sensor 1051 in accordance with a predetermined guidance message or the like displayed on the output apparatus 106 by the registration terminal 100.

At this time, the sensor part 110 of the registration terminal 100 acquires biological information, such as finger veins, from the fingers sequentially held by the registration target user, for example, each of the first finger, the second finger, the third finger, and the fourth finger, through the sensor 1051 of the input apparatus 105, and stores the biological information, for example, into the memory 103 temporarily (S201). In this case, since biological information is acquired from each of the four fingers, the total number N of acquired pieces of biological information for registration is four.

Note that it is assumed in this embodiment that N(N>1) different pieces of biological information are acquired for the registration target user. For example, if the veins of the first finger, the second finger, the third finger, and the fourth finger of one hand are acquired, N=4; if the veins of the first fingers, the second fingers, and the third fingers of both hands are acquired, N=6; if the fingerprints of the same fingers are further acquired, N=12; and if the irises of both eyes are further acquired, N=14. As described above, it is assumed that at the registration of the registration target user, all the N pieces of biological information are acquired and used for creating the protection templates.

As for the order of the registration target user holding his/her body parts over the sensor 1051, in other words, the input order, it can be assumed that there is a case where the output apparatus 106 gives an instruction on a predetermined order to the user or a case where the user decides the order arbitrarily and inputs with the input apparatus 105. In these cases, in either case, the above input order is fixed at the time of registration and at the time of authentication as long as the user is the same, and this will be called "order fixed". In either case, the body parts the input order of which is specified and the feature data for registration are associated with each other, and the registration terminal 100 stores the biological information acquired from the sensor 1051 into the memory 103 associating the biological information with the identification information of the body parts the input order of which is specified.

Note that this embodiment may be configured such that the authentication target user arbitrarily selects the input order at authentication while the input order at registration is fixed, and this will be called "order selectable". Or alternatively, other order determination methods, for example, a method combining "order fixed" and "order selectable" in which inputting in the order of six fingerprints, six veins, and two irises is fixed, but the order can be selected among six finger prints, may be adopted.

Next, the feature extraction part 111 of the registration terminal 100 extracts N sets of feature data for registration $X\_1, X\_2, \ldots$, and $X\_N$ from the N pieces of biological information for registration described above, and stores these feature data into the memory 103 temporarily (S202). Here, as for variables k and J used in later procedure, the protection template creation part 113 of the registration terminal 100 stores the values k=1, and j=1 in an appropriate work area provided in the memory 103 (S203).

Then, the protection template creation part 113 of the registration terminal 100 selects a combination of k sets of feature data for registration $S\_j=(X\_i\_1, X\_i\_2, \ldots, X\_i\_k)$ out of the above N sets of feature data for registration held in the memory 103 (S204). Here, in the case of the order fixed described above, $S\_j$ is k sets of feature data for registration from the head in the input order. On the other hand, in the case of the order selectable described above, the protection template creation part 113 repeats the subsequent steps S204 to S207 for all combinations of selecting k sets out of N sets.

Next, the protection template creation part 113 creates synthesized feature data from the group $S\_J$ of k sets of feature data for registration selected above (S205). Any method can be used for synthesizing k sets of feature data for registration. For example, in the case where each set of the feature data for registration $X\_i\_1$ (l=1, 2, . . . , k) is expressed in a vector format (including a bet sequence), the data in the vector format in which each set of the feature data is multiplied by an appropriate constant and coupled together may be obtained as the synthesized feature data. Or alternatively, the synthesized feature data may be obtained by multiplying each set of the feature data for registration $X\_i\_1$ by an appropriate constant and then applying mutual arithmetic operations, such as addition and subtraction, to the resultant data.

Next, the protection template creation part 113 creates a protection template $T\_j$ from the synthesized feature data obtained at the above step S205 and stores the protection template $T\_j$ into the template database 120 (S206). As already illustrated with reference to FIG. 4, the protection template created and stored by the protection template creation part 113 is associated with the identification information of the body parts associated with the feature data for registration from which the synthesized feature data are derived.

Note that in this embodiment, determination is made sequentially at the time of authentication, encryption, and placement of a signature, and an acceptable FAR value for each determination (acceptable FAR value) is set in advance and kept by the registration terminal 100. The protection template creation part 113 described above sets a threshold t (for example, the correction capability of the error correction code) so as to achieve the acceptable FAR value and creates the protection template.

When the above k is smaller than a specified value, for example, when k=1, the FRR of the protection template to achieve the above acceptable FAR value is relatively high. However, as k increases, the FRR of the protection template to achieve the same acceptable FAR value decreases relatively. This is because combining multiple pieces of biological information increases the amount of information, allowing for verification with better accuracy, thereby, decreasing the FRR while the protection template has the same FAR.

Then, the protection template creation part 113 changes the above variable j as j=j+1 (S207). In this stage (in the case of the above order selectable), the protection template creation part 113 determines whether protection templates have been created for all the combinations of selecting k sets of feature data for registration out of N sets (S208), and if not (S208: n), returns the processing to step S204.

On the other hand, if protection templates have been created for all the combinations of selecting k sets of feature data for registration out of N sets (S208: y), the protection template creation part 113 changes the above variable k as k=1 (S209). Here, if k=N (S210: y), the protection template creation part 113 sets m as m=j, and transmits to the template database 120, a group of all the m created protection templates T=(T_1, . . . , T_m) together with the user ID described above (S211). On the other hand, if k<N (S210: n), the protection template creation part 113 returns the processing to step S204. Here, if the input order is the order fixed described above, m=N, and if the input order is the order selectable, m=2^N−1 (where 2^N is 2 to the power of N).

Meanwhile, the template DB 120 stores the m protection templates described above transmitted from the protection template creation part 113 of the registration terminal 100 through the network 140, associating them with the corresponding user ID (S212), and terminates the processing. The template database 120 is created through the series of processings described above.

As has been described above, by creating the protection templates at registration processing for all the combinations of biological information, which will be sequentially inputted at authentication, encryption, and placement of a signature, and keeping the required FAR value for each protection template constant, it is possible to prevent reconstitution or estimation of the biological information, or impersonation by brute force attacks.

———Processing Procedure Example 2———

Figure 6:
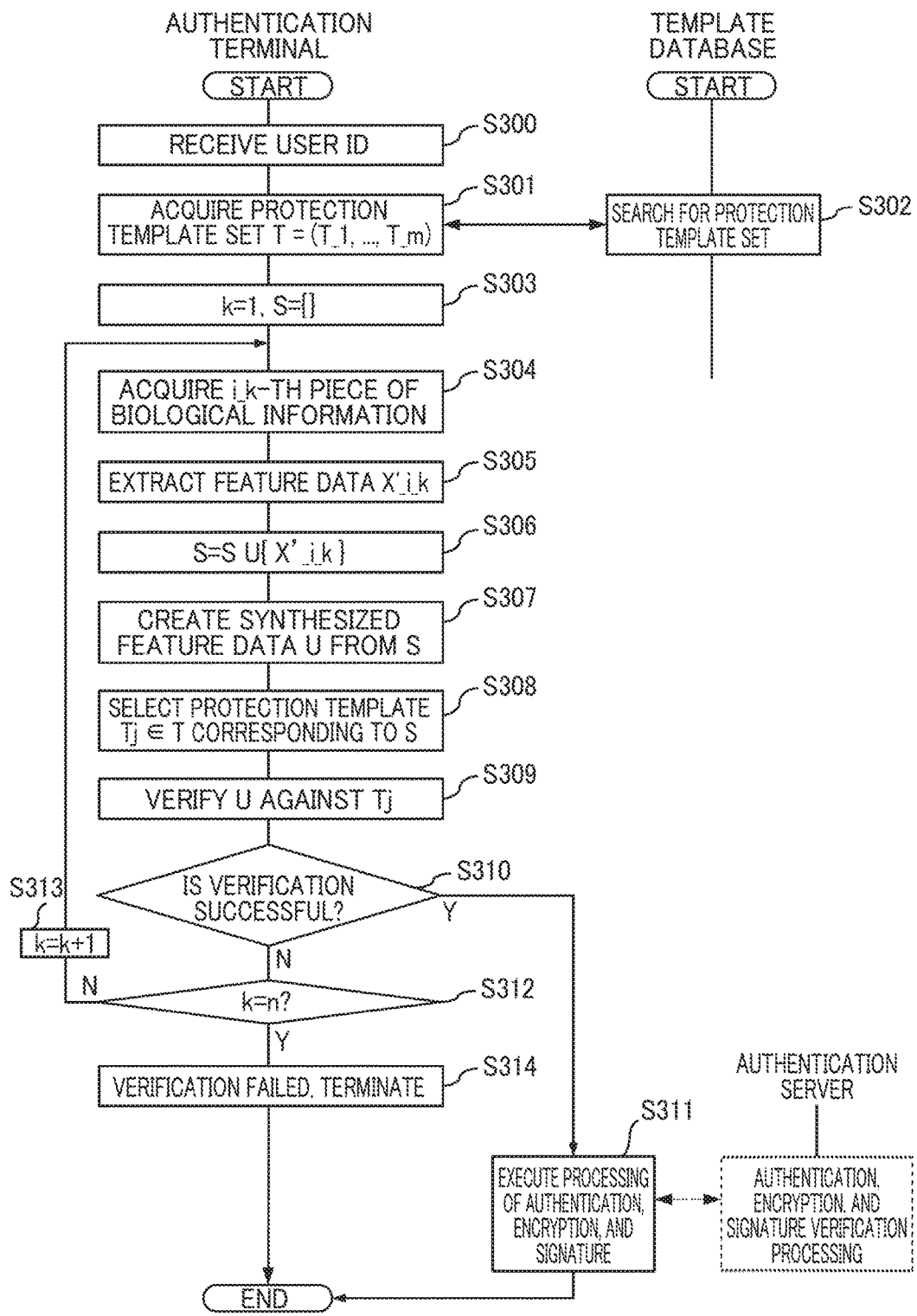
FIG. 6 is a flowchart illustrating a processing procedure example 2 of the sequential biometric cryptography processing method of this embodiment.

Next, descriptions will be provided for verification processing related to biological information of users based on the figure. FIG. 6 is a flowchart illustrating a processing procedure example 2 of the sequential biometric cryptography processing method of this embodiment, to be specific, a flowchart illustrating verification processing in the sequential biometric cryptography processing method of this embodiment. Here, the "verification processing" means a series of processings including the processing of verifying the feature data derived from the biological information acquired by reading out from an authentication target user against the protection template already registered in advance on the user in the template database 120, and also processing executed depending on the result, such as authentication, encryption and decryption of data, and an electronic signature.

Assume the situation where the registration target user, who has been subjected to the processing at the registration terminal 100 illustrated in FIG. 5 described above, later operates the authentication terminal 150, such as an ATM, to actually receive services at the banking institution. Here, assume that the registration target user has become the authentication target user.

In this case, first, the ID input part 160 of the authentication terminal 150 receives an ID inputted by the above user, in other words, the authentication target user with the input apparatus 155, such as a touch panel or the like (S300). Next, the protection template acquisition part 161 of the authentication terminal 150 searches the template database 120 using the user ID received at the above step S300 as a key, and acquires a set of protection templates associated with the corresponding user ID, T_1, . . . , T_m (S301, S302).

Here, as for variables k and S used in later procedure, the sensor part 162 of the authentication terminal 150 stores the values k=1, and S={ } ({ } means an empty set) in an appropriate work area provided in the memory 103 (S303). Among these, "S" is a feature data set which has already been acquired.

Next, the sensor part 162 of the authentication terminal 150 acquires the biological information of the body part held by the authentication target user over the sensor 1551 (S304). Note that if the verification result described later fails, the authentication target user is supposed to hold over the sensor 1551 another body part which is different from the body parts that have already been acquired at step S304 by the time.

As described above, considering repetitive operations at step S304, the value of the variable k described above is counted in this embodiment as the number of operations at step S304, in other words, acquiring operations. Hence, assume that the sensor part 162 has acquired the i_k-th piece of biological information from the authentication target user. Since the operation at this moment corresponds to the first execution of the step S304, this means that the biological information with k=1, in other words, the first piece of biological information has been acquired, as shown in the above step S303. For example, if the order of the user's input is the right first finger→the right second finger→the left first finger→the left second finger→the right third finger→the left third finger, the biological information of the right first finger is first acquired as the first piece of biological information in the input order, in other words, the biological information i_1.

Next, the feature extraction part 163 of the authentication terminal 150 extracts feature data X'_i_k from the i_k-th piece of biological information acquired at the above step S304 (S305). In the above example, this means that feature data are extracted from the biological information of the right first finger, which is the first piece of biological information in the input order, in other words, the biological information i_1. For a method of extracting feature data from biological information, some conventional technique can be employed as appropriate.

The feature extraction part 163 of the authentication terminal 150 adds the feature data X'_i_k acquired at the above step S305 to the set S of the already acquired feature data described above (S306). The set S of the already acquired feature data at this moment is expressed as S=S∪{X'_i_k}.

Next, the feature extraction part 163 of the authentication terminal 150 creates synthesized feature data U from the set S of the already acquired feature data described above (S307). Assume that the synthesizing method here is the same as that in the step S205 in the registration processing. In the specific example that has been described, the biological information acquired from the authentication target user up to this point of time is only the biological information of the right first finger, which is the first piece of biological information in the input order, in other words, the biological information i_1. Accordingly, the feature data included in the set S of the already acquired feature data are only the feature data X'_i_1, and the synthesized feature data U is also based only on the feature data X'_i_1.

Next, the authentication•encryption•signature part 164 of the authentication terminal 150 selects a protection template T_j corresponding to the synthesized feature data U obtained at the above step S307 out of the above group T of protection templates (which has been obtained at steps S301 and S302) (S308). Here the "protection template corresponding to U" means a protection template created from the group of biological information of the same body parts as the synthesized feature data U have been created from. Hence, in the case described above, the authentication•encryption•signature part 164 selects the protection template that has been already registered on the "right first finger" the biological information of which has been acquired in the input order corresponding to the present value of k, in other words, k=1. In the case of the template database 120 illustrated in FIG. 4, for example, the protection template to be selected corresponds the protection template regarding only one body part "A", which is the first record, in other words, the first in the input order.

Next, the authentication•encryption•signature part 164 of the authentication terminal 150 verifies the above synthesized feature data U against the protection template T_j selected at step S308 (S309). For example, in the case of using the technique disclosed in Non Patent Literature 1, the verification processing here corresponds to the processing of reconstituting a secret key from auxiliary information and verifying the hash value of the secret key, and the like.

If the verification described above is successful (S310: y), the authentication•encryption•signature part 164 of the authentication terminal 150 executes predetermined processing, such as authentication, encryption and decryption of data, and placement of an electronic signature for the authentication target user described above (S311). For example, in the case where the secret key is reconstituted at step S309, the authentication•encryption•signature part 164, at the step S311, may execute challenge response authentication between the authentication terminal 150 and a specified authentication server based on the secret key, perform encryption or signature processing on some electronic data using the secret key, or decrypt encrypted data with the secret key, for example.

On the other hand, if the above verification failed (S310: n), the authentication·encryption•signature part 164 of the authentication terminal 150 determines whether k<n, where n is a specified input upper limit (S312). As a result of this determination, if k<n (S312: n), the authentication•encryption•signature part 164 recognizes that further reading of additional biological information and subsequent determination can be performed in the same manner, increments k, in other words, sets k=k+1 (S313), and returns the processing to the above step S304. Here, n≤N, in other words, the input upper limit n does not exceed the total number of pieces of biological information N. In the case where n<N, the processing of steps S204 to S205 in the registration processing described above only needs to be repeated with k=1, 2, . . . , n.

As described above, in the case where the authentication•encryption•signature part 164 recognizes that further reading of additional biological information and subsequent determination can be performed in the same manner, and returns the processing to step S304, the sensor part 162 of the authentication terminal 150, at the step S304, acquires in the state where the variable k=2, and S={feature data X'_i_1}, for example, the biological information of the "right second finger", which is the next body part that the authentication target user holds over the sensor 1551, in other words, the second piece of biological information in the input order, or the biological information i_2.

At the following step S305, the feature extraction part 163 extracts feature data X'_i_2 from the biological information of the right second finger, which is the i_2-th pieces of biological information acquired at the above step S304.

In the same manner, the feature extraction part 163 at step S306, adds the feature data X'_i_2 acquired at the above step S305 to the set S of the already acquired feature data described above. The set S of the already acquired feature data at this moment is expressed as S=S∪{X'_i_1, X'_i_2}.

Next, the feature extraction part 163, at step S307, creates synthesized feature data U from the set S of the already acquired feature data described above. Since up to this point of time, acquired from the above authentication target user have been the pieces of biological information of the right first finger and the right second finger, which are the first and the second pieces of biological information in the input order, in other words, the biological information i_1 and i_2, the feature data U is created from these.

Next, the authentication•encryption•signature part 164, at step S308, selects the protection template T_j corresponding to the synthesized feature data U obtained at the above step S307 out of the above group T of protection templates (which has been obtained at steps S301 and S302). In the case described above, the authentication•encryption•signature part 164 selects the protection template that has been already registered on the group of the "right first finger" and the "right second finger" acquired in the input order corresponding to the present value of k, in other words, k=2. In the case of the template database 120 illustrated in FIG. 4, for example, the template to be selected corresponds to the protection template regarding the two body parts "A" and "B", which is the second record, in other words, the second in the input order.

Next, the authentication•encryption•signature part 164, at step S309, verifies the above synthesized feature data U against the protection template T_j selected at step S308, and hereafter depending on this verification result, executes the steps S310 to S311 or the steps S310 to S313 described above in the same manner.

Here, return to descriptions of the above step S312. If the verification fails (S310: n) and k=n (S312: y), the authentication•encryption•signature part 164 executes specified processing, such as displaying a message indicating the authentication failure on the output apparatus 156 (S314), and terminates the subsequent procedure.

As described above, in this embodiment, while letting the user sequentially input biological information, the authentication terminal 150 of the sequential biometric cryptosystem 10 combines pieces of biological information inputted up to the point of time, creates synthesized feature data, and verifies the synthesized feature data against the corresponding protection template. As the sequential processing progresses, the number of pieces of biological information increases. Accordingly, the amount of information of the synthesized feature data increases, which makes it possible to authenticate a person more reliably, in other words, increases the probability of accepting an authentic person. In this way, even in biometric cryptography in which verification scores cannot be calculated, it is possible to achieve the same accuracy improvement effect as sequential determination methods using verification scores do. Further in this embodiment, since the probability of incorrectly accepting an inauthentic person is always controlled to be lower than or equal to the FAR in each sequential determination processing, it is also possible to prevent reconstitution or estimation of the biological information, or impersonation by brute force attacks.

Note that in the flowchart in FIG. 6, in other words, the verification processing, described above, a form in which the step of acquiring user IDs (S300) is not executed may be employed. In this case, the authentication terminal 150 does not need to include the ID input part 160. The case of not acquiring user IDs corresponds to the situation where processing for existence recognition of the user is performed. At step S301, the group T of protection templates for all possible user IDs is acquired.

In addition, the authentication•encryption•signature part 164, at step S308, selects the protection template T_j corresponding to the synthesized feature data U from each of the groups T of protection templates for all possible user IDs described above, and at step S309, verifies the synthesized feature data U against the protection templates T_j.

If verifying the synthesized feature data U against a protection template in one of the groups T of protection templates for all the possible user IDs is successful at step S310, the authentication•encryption•signature part 164 may output the corresponding use ID to the output apparatus 156 at step S311; or in the case where the secret key is reconstituted at step S309, the authentication•encryption•signature part 164 may execute challenge response authentication between the authentication terminal 150 and a specified authentication server based on the corresponding user ID and the secret key, perform encryption or signature processing on some electronic data using the secret key, or decrypt encrypted data with the secret key.

Until now, descriptions have been specifically provided for the best mode and the like for carrying out the present invention. However, the present invention is not limited to those. Various modifications can be made without departing the gist of the present invention.

In biometric cryptography that executes processing such as authentication, encryption, and placement of a signature with biological information kept hidden, this embodiment described above achieves high authentication accuracy by combining multiple pieces of biological information while improving the convenience by minimizing the number of pieces of biological information that a user needs to input at processing such as authentication, encryption, and placement of a signature. This embodiment, in turn, implements sequential multimodal determination having a high accuracy improvement effect and achieves good security, accuracy, and convenience all together regarding the cryptographic processing.

According to the descriptions in this specification, at least the following is apparent. That is, in the sequential biometric cryptosystem according to this embodiment, the computing apparatus may execute at least one of authorization of the user, encryption of specified data, decryption of specified data, and creation of an electronic signature, as the specified processing on the user in the verification processing.

According to this configuration, each processing of user authentication, encryption and decryption of data, and placement of electronic signature associated with the biometric cryptography processing can be executed under good security, accuracy, and convenience.

In the sequential biometric cryptosystem according to this embodiment, in the verification processing, the computing apparatus may sequentially acquire mutually different pieces of biological information on the specified user through the sensor from a start of the verification processing; extract a set of feature data from each of all the pieces of biological information acquired after the start of the verification processing and before a present time point, and combine the extracted sets of feature data; verify the combination of the extracted feature data against the protection template derived from the biological information having the same specified attribute as the combination of the extracted feature data; and perform, if the verification is successful, the specified processing on the user.

According to this configuration, even if the verification on the body part that the user let the sensor read at the start of the verification processing, for example, the first finger, fails, processing is executed, such as extracting feature data from each pieces of biological information of the second finger that the user subsequently let the sensor read and the first finger already read, and combining the extracted sets of feature data, and verifying this combination of the feature data against the protection template holding information on the first finger and the second finger of the user. Thus, every time the processing of sequentially acquiring biological information advances, the number of pieces of biological information increases, and the amount of information of feature data also increases, which makes it possible to authenticate a person more reliably. In other words, as the sequential processing described above advances, the probability of successful authentication of an authentic person increases (which is synonymous with decreasing the false rejection rate).

In the sequential biometric cryptosystem according to this embodiment, in the verification processing, the computing apparatus, if the verification fails, may determine whether the number of acquired pieces of biological information from the start of the verification processing has reached a specified number, if a result of the determination indicates that the number of acquired pieces has not reached the specified number, iterate the processing of sequentially acquiring mutually different pieces of biological information, the verifying the combination of feature data against the protection template, and following processing, and if a result of the determination indicates that the number of acquired pieces has reached the specified number, determine that the verification processing failed and terminates following processing.

According to this configuration, as the processing of sequentially acquiring biological information described above advances, the probability of successful authentication of an authentic person increases. Together with this effect, it is possible, for example, to get out early of the situation of a verification failure caused simply because of the user's posture with respect to the sensor, or the like (before reaching the specified number described above) and to execute the verification processing again. As a result, it is possible to improve the entire processing efficiency.

In addition, in the sequential biometric cryptosystem according to this embodiment, in the registration processing, the computing apparatus may create a protection template that achieves a specified false acceptance rate.

According to this configuration, together with the decrease in the false rejection rate (FRR) described above, the false acceptance rate can be made less than or equal to a specified standard, which further improves the effect of avoiding the occurrence of impersonation by an inauthentic person.

In addition, in the sequential biometric cryptosystem according to this embodiment, in the registration processing, the computing apparatus may sequentially select, out of the extracted multiple sets of feature data, a group of multiple sets of feature data, incrementing the number of combined sets, in accordance with a predetermined input order of biological information determined for each user, and create a protection template for each selected group of feature data.

According to this configuration, in accordance with the order in which the user let the sensor read each body part, for example, the order of the first finger, the second finger, the third finger, and the fourth finger, a group of multiple sets of feature data are sequentially selected, incrementing the number of combined sets from one, for example, a group of only the first finger, a group of the first and second fingers, a group of the first, second, and third fingers, and so on, and a protection template is created for each selected group of feature data. In this case, reading biological information in a predetermined order and verification against protection templates in accordance with this reading are efficiently performed, which further improves the entire processing efficiency.

In the sequential biometric cryptosystem according to this embodiment, in the registration processing, the computing apparatus, when selecting, out of the extracted multiple sets of feature data, a group of sets of feature data in the number of combined sets, may select all the possible combinations of feature data in the number of combined sets, and create a protection template for each selected group of feature data.

According to this configuration, protection templates are created which can be applied to the situation where the order in which the user lets the sensor read each body part is not defined. In this case, it is possible to execute reliably reading biological information in an arbitrary order selected by the user and verification against the protection templates in accordance with this reading.

In addition, the sequential biometric cryptosystem according to this embodiment may include a registration terminal that executes the registration processing and an authentication terminal that executes the verification processing.

According to this configuration, in the situation, for example, where a terminal with which biological information of users are registered such as a teller terminal at a banking institution and a terminal with which authentication is executed based on the users' biological information such as an ATM terminal at a banking institution are provided as separate apparatuses, it is possible to execute processing of sequential biometric cryptography.

In addition, in the sequential biometric cryptography processing method according to this embodiment, the information processing apparatus may execute at least one of authorization of the user, encryption of specified data, decryption of specified data, and creation of an electronic signature, as the specified processing on the user in the verification processing.

In addition, in the sequential biometric cryptography processing method according to this embodiment, in the verification processing, the information processing apparatus may sequentially acquire mutually different pieces of biological information on the specified user through the sensor from a start of the verification processing; extract a set of feature data from each of all the pieces of biological information acquired after the start of the verification processing and before a present time point, and combine the extracted sets of feature data; verify the combination of the extracted feature data against the protection template derived from the biological information having the same specified attribute as the combination of the extracted feature data; and perform, if the verification is successful, the specified processing on the user.

In addition, in the sequential biometric cryptography processing method according to this embodiment, in the verification processing, the information processing apparatus if the verification fails, may determine whether the number of acquired pieces of biological information from the start of the verification processing has reached a specified number, if a result of the determination indicates that the number of acquired pieces has not reached the specified number, iterate the processing of sequentially acquiring mutually different pieces of biological information, the verifying the combination of feature data against the protection template, and following processing, and if a result of the determination indicates that the number of acquired pieces has reached the specified number, determine that the verification processing failed and terminates following processing.

In addition, in the sequential biometric cryptography processing method according to this embodiment, in the registration processing, the information processing apparatus may create a protection template that achieves a specified false acceptance rate.

In addition, in the sequential biometric cryptography processing method according to this embodiment, in the registration processing, the information processing apparatus may sequentially select, out of the extracted multiple sets of feature data, a group of multiple sets of feature data, incrementing the number of combined sets, in accordance with a predetermined input order of biological information determined for each user, and create a protection template for each selected group of feature data.

In addition, in the sequential biometric cryptography processing method according to this embodiment, in the registration processing, the information processing apparatus, when selecting, out of the extracted multiple sets of feature data, a group of sets of feature data in the number of combined sets, may select all the possible combinations of feature data in the number of combined sets, and create a protection template for each selected group of feature data.

REFERENCE SIGNS LIST

10 sequential biometric cryptosystem
100 registration terminal
101, 151 storage apparatus
102, 152 program
103, 153 memory
104, 154 CPU
105, 155 input apparatus
106, 156 output apparatus
107, 157 communication apparatus
110 sensor part
111 feature extraction part
112 ID input part
113 protection template creation part
120 template DB
140 network
150 authentication terminal
160 ID input part
161 protection template acquisition part
162 sensor part
163 feature extraction part
164 authentication•encryption•signature part

The invention claimed is:

1. A sequential biometric crvptosystem that improves security of a computer network, the cryptosystem comprising:
a sensor that acquires biological information about a user;
a communication interface that is communicatively coupled to a registration system via a network;
a memory; and
a processor communicatively coupled to the sensor, the communication interface and the memory;

wherein the processor is configured to:
receive, from the sensor, first biological information of the user,
extract feature data from the first biological information to form first extracted feature data;
retrieve, using the communication interface, a protection template from the registration system,
calculate a first verification score by comparing the first extracted feature data with the protection template,
on a condition that the first verification score is less than a threshold,
receive, from the sensor, second biological information of the user,
extract feature data from the second biological information to form second extracted feature data;
create synthesized feature data from the first extracted feature data and second extracted feature data;
calculate a second verification score by comparing the synthesized feature data with the protection template; and
on a condition that the second verification score is not less than the threshold, permit the user to perform a specified processing operation;
and
on a condition that the first verification score is not less than the threshold,
permitting the user to perform the specified processing operation.

2. The sequential biometric cryptosystem according to claim 1,
wherein the specified processing operation is at least one of authorization of the user, encryption of specified data, decryption of specified data, and creation of an electronic signature.

3. The sequential biometric cryptosystem according to claim 1,
wherein on a condition that the second verification score is less than the threshold, the processor performs an iterative process until a number of iterations is exceeded or a respective verification score is not less than the threshold; the iterative process comprising:
receiving, from the sensor, respective information of the user,
extracting feature data from the respective biological information to respective extracted feature data,
creating respective synthesized feature data from the synthesized feature data and synthesized feature data from prior iterations, and
calculating the respective score by comparing the respective synthesized feature data with the protection template;
wherein on a condition that the number of iterations is exceeded, the processor determines that the user is not permitted to perform the specified processing operation.

4. The sequential biometric cryptosystem according to claim 1, wherein the threshold is based on a specified false acceptance rate.

5. The sequential biometric cryptosystem according to claim 1, wherein the protection template is generated by:
extracting a set of feature data from each of a predetermined number of pieces of biological information acquired from multiple kinds of biological parts of the user;
selecting all possible combinations of the feature data within the number of the feature data based on the biological information of each biological part according to an input order predetermined in each user among the multiple kinds of biological parts; and
creating the protection template for each of the all combinations selected according to the input order.

6. A sequential biometric cryptography processing method that improves security of a computer network, the method comprising:
receiving, by a processor, first biological information of a user that is acquired by a sensor;
extracting, by the processor, feature data from the first biological information to form first extracted feature data;
retrieving, by the processor, a protection template from a registration system via a communication interface;
calculating, by the processor, a first verification score by comparing the first extracted feature data with the protection template,
on a condition that the first verification score is less than a threshold,
receiving, by the processor, second biological information of the user from the sensor via the communication interface,
extracting, by the processor, feature data from the second biological information to form second extracted feature data;
creating, by the processor, synthesized feature data from the first extracted feature data and second extracted feature data;
calculating, by the processor, a second verification score by comparing the synthesized feature data with the protection template; and
on a condition that the second verification score is not less than the threshold, permitting the user to perform a specified processing operation;
and
on a condition that the first verification score is not less than the threshold, permitting the user to perform the specified processing operation.

7. The sequential biometric cryptography processing method according to claim 6,
wherein the specified processing operation is at least one of authorization of the user, encryption of specified data, decryption of specified data, and creation of an electronic signature, as the specified processing on the user in the verification processing.

8. The sequential biometric cryptography processing method according to claim 6, wherein on a condition that the second verification score is less than the threshold, the processor performs an iterative process until a number of iterations is exceeded or a respective verification score is not less than the threshold; the iterative process comprising:
receiving, from the sensor, respective information of the user,
extracting feature data from the respective biological information to respective extracted feature data,
creating respective synthesized feature data from the synthesized feature data and synthesized feature data from prior iterations, and
calculating the respective score by comparing the respective synthesized feature data with the protection template;
wherein on a condition that the number of iterations is exceeded, the processor determines that the user is not permitted to perform the specified processing operation.

9. The sequential biometric cryptography processing method according to claim 6, wherein the threshold is determined based on a specified false acceptance rate.

10. The sequential biometric cryptography processing method according to claim 6, wherein the protection template is generated by:
- extracting a set of feature data from each of a predetermined number of pieces of biological information acquired from multiple kinds of biological parts of the user;
- selecting all possible combinations of the feature data within the number of the feature data based on the biological information of each biological part according to an input order predetermined in each user among the multiple kinds of biological parts; and
- creating the protection template for each of the all combinations selected according to the input order.

\* \* \* \* \*